US008368741B2

(12) United States Patent
Jelley et al.

(10) Patent No.: US 8,368,741 B2
(45) Date of Patent: Feb. 5, 2013

(54) APPARATUS AND SYSTEM FOR IMPROVING IMAGE QUALITY

(75) Inventors: Kevin W. Jelley, Lagrange, IL (US);
Ruei-Sung Lin, Schaumburg, IL (US);
Bei Tang, Palatine, IL (US)

(73) Assignee: General Instrument Corporation, Horsham, PA (US)

( * ) Notice: Subject to any disclaimer, the term of this patent is extended or adjusted under 35 U.S.C. 154(b) by 1548 days.

(21) Appl. No.: 11/769,002

(22) Filed: Jun. 27, 2007

(65) Prior Publication Data

US 2009/0002475 A1    Jan. 1, 2009

(51) Int. Cl.
*H04N 7/14* (2006.01)
(52) U.S. Cl. .................... 348/14.12; 348/14.02
(58) Field of Classification Search .... 348/14.12–14.15, 348/14.01–14.02, 14.07–14.09
See application file for complete search history.

(56) References Cited

U.S. PATENT DOCUMENTS

| | | | |
|---|---|---|---|
| 6,640,130 B1 | 10/2003 | Freeman | |
| 6,806,469 B2 | 10/2004 | Kerr | |
| 7,134,756 B2* | 11/2006 | Drucker et al. | 353/77 |
| 7,199,366 B2 | 4/2007 | Hahn et al. | |
| 7,208,733 B2* | 4/2007 | Mian et al. | 250/330 |
| 8,049,816 B2* | 11/2011 | Viinikanoja et al. | 348/375 |
| 2001/0008412 A1* | 7/2001 | Ando et al. | 348/14.02 |
| 2002/0173723 A1 | 11/2002 | Lewis | |
| 2003/0035586 A1* | 2/2003 | Chou et al. | 382/233 |
| 2003/0074461 A1 | 4/2003 | Kang et al. | |
| 2004/0005086 A1 | 1/2004 | Wolf | |
| 2006/0008171 A1 | 1/2006 | Petschnigg | |
| 2006/0102843 A1* | 5/2006 | Bazakos et al. | 250/339.05 |
| 2006/0268115 A1 | 11/2006 | Eggers et al. | |
| 2008/0278592 A1* | 11/2008 | Kuno et al. | 348/222.1 |

OTHER PUBLICATIONS

PCT International Search Report & Written Opinion, RE: PCT Application #PCT/US2008/067837 May 18, 2009.
Lind AT&T S: "ENUM Call Flows for VoIP Interworking; draft-lind-enum-callflows-03.txt" (whole document) Feb. 1, 2002.
Livingood Comcast Cable Communications R Shockey Neustar J: "IANA Registration for Enumservice Containing PSTN Signaling Information; draft-ietf-enum-pstn-05.txt" (whole document) Aug. 1, 2006.
Scheunders, P., "Local Mapping for Multispectral Image Visualization", Vision Lab, Department of Physics, University of Antwerp, Imaging and Vision Computing, vol. 19, Issue 13, Nov. 1, 2001.
Gyaourova A., Bebis G., Pavlidis I., "Fusion of infrared and visible images for face recognition", Proceedings of the European Conference on Computer Vision (ECCV'04), vol. 4, p. 456-468, Prague, Czech Republic, May 2004.

\* cited by examiner

*Primary Examiner* — Brandon Miller
(74) *Attorney, Agent, or Firm* — Lori Anne D. Swanson

(57) ABSTRACT

A system and an apparatus for improving image quality of an object in video telephony are described. The apparatus comprises an image detection unit, an image alignment unit and an image fusion unit. A near infrared light source in the image detection unit illuminates the object, such that the object is front illuminated. An image sensor alongside the near infrared light source generates a near infrared image and a visible image. An image alignment unit aligns the near infrared image and the visible image. An image fusion unit fuses the aligned near infrared image and aligned visible image pair to form a composite image of the object. The composite image of the object has improved image quality, image detail, and a reduction in shadows.

20 Claims, 3 Drawing Sheets

APPARATUS AND SYSTEM FOR IMPROVING IMAGE QUALITY

FIELD OF THE INVENTION

The present invention relates in general to the field of video telephony, and more specifically, to improving image quality in such field.

BACKGROUND

It is anticipated that video telephony will emerge as an important application. In one approach, a television and a set top box provide communication of images. Additionally, a camera is often used to capture an image of a speaker within a room. However, it is a known problem that ambient lighting in a typical family or living room represents a challenge to capturing a good image of the speaker. Since ambient lighting consists of multiple point-source illuminators that are often located behind or laterally to the speaker, a sub-optimal image of the speaker results. For example, the image may be underexposed or have low contrast. Further, the image may contain shadows or brightspots. Also, for aesthetic reasons, room illumination is often understated in brightness, causing the room to have a "warm" appearance. However, low room illumination makes it difficult to capture details. Details of the room or of the speaker may be difficult to comprehend. The resulting overall image is low in contrast and color fidelity. While the speaker may be willing to improve upon the ambient lighting by strategically placing the lamps or increasing the brightness of the lamps in order to improve a captured image, it is unlikely that the speaker will be willing to augment the lighting to the extent that shadow free images with optimal brightness, contrast, and color are achieved. Thus, a way to improve image quality is desirable.

BRIEF DESCRIPTION OF THE FIGURES

The present invention is illustrated by way of example, and not limitation, in the accompanying figures, in which like references indicate similar elements, and in which.

Figure 1:
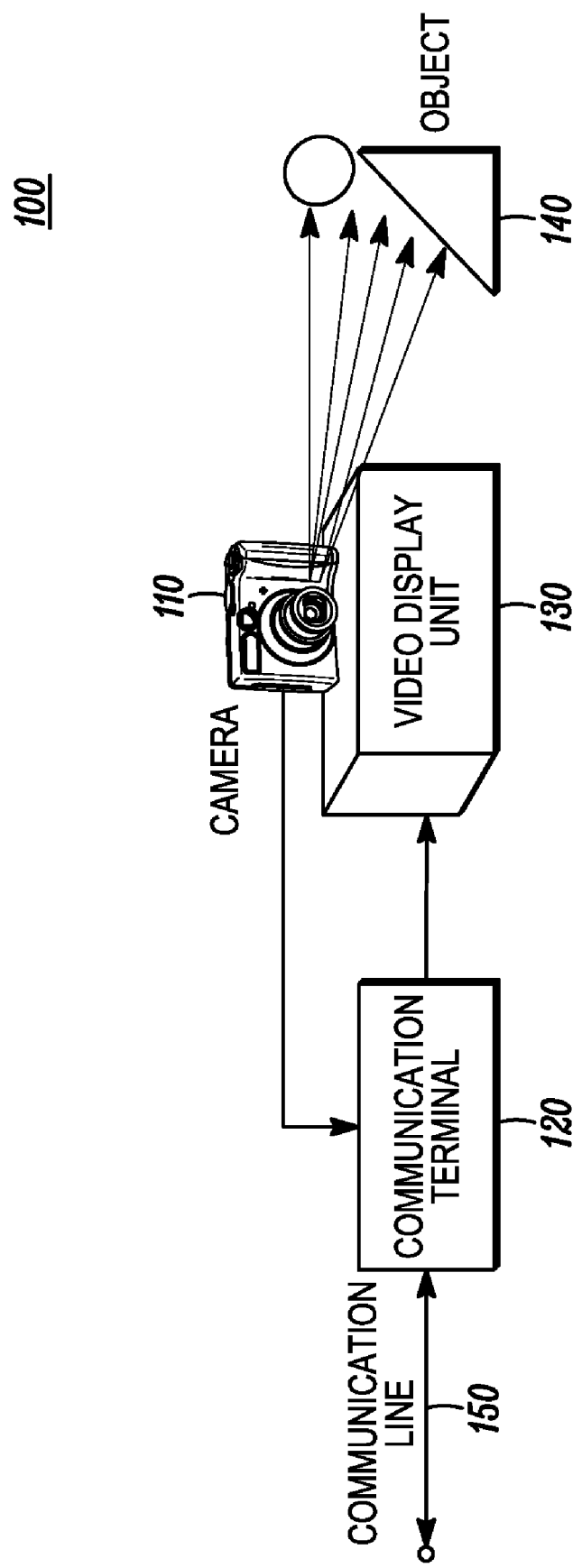
FIG. 1 is a block diagram illustrating a system for improving image quality in video telephony.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Various embodiments of the present invention provide an apparatus for improving image quality in video telephony. The apparatus includes an image detection unit comprising a near infrared light source for illuminating an object so that the object is front illuminated. An image sensor for generating a near infrared image responsive to reflected near infrared radiation from the object. An infrared filter for filtering the reflected near infrared radiation from the object and for facilitating the image sensor to generate a visible image responsive to reflected visible light from the object. An image alignment unit coupled to the image sensor of the image detection unit for aligning the near infrared image and the visible image generated by the image sensor. The output of the image alignment unit is processed in an image fusion unit for forming a composite image of an object in the apparatus's field of view.

Before describing in detail a particular apparatus for improving image quality in video telephony, it should be observed that the present invention resides primarily in apparatus components related to improving image quality. A system for improving image quality in video telephony is also shown. Accordingly, the apparatus and the system components have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second and the like may be used solely to distinguish one entity or action from another entity or action without necessarily requiring or implying any actual such relationship or order between such entities or actions. The terms 'comprises,' 'comprising,' or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by 'comprises . . . a' does not, without more constraints, preclude the existence of additional identical elements in the process, method, article, or apparatus that comprises the element.

The term 'another', as used herein, is defined as at least a second or more. The terms 'including' and/or 'having', as used herein, are defined as comprising.

FIG. 1 is a block diagram illustrating a system 100 for improving image quality in video telephony. The system 100 includes a camera 110, a communication terminal 120 and a video display unit 130. The camera 110 includes a near infrared light source for illuminating an object 140 to be captured. In one example, the object 140 is front illuminated by the near infrared light source. The camera 110 also includes an image sensor for generating a near infrared image responsive to reflected near infrared radiation and for generating a visible image responsive to reflected visible light from the object 140. The camera 110 processes the near infrared image and the visible image for forming a composite image of the object 140. The camera 110 then transmits the composite image to the communication terminal 120. As used herein, examples of the object 140 are a person, a scene, a thing, multiple people, or things in a user environment (e.g. a home setting or an office). Coupled to the camera 110 is the communication terminal 120. In an example embodiment, the communication terminal 120 is a set-top box which is capable of receiving and transmitting audio-visual signals. The communication terminal 120 receives a composite image of the object 140 from the image fusion unit of the camera 110 and transmits the composite image to the video display unit 130.

In addition, the communication terminal 120 transmits the composite image to a communication line 150. Further, the communication line 150 transmits the composite image to an end user. Examples of communication line 150 are a telephone line, ethernet cable, coaxial cable, a satellite dish, internet protocol (IP) networks, power line communication etc. The end user can be any person or entity communicating with the system 100 through the communication line 150.

Further, the communication terminal 120 receives images from the end user and/or the camera 110 and sends the received images to the video display unit 130. The video display unit 130 displays images received from the communication terminal 120. The video display unit 130 can be any computing device or communication device capable of displaying image data. A television (TV), a monitor, and an image projector are all examples of video display unit 130.

In this system 100, a video telephony application such as a videoconference can be broadcasted and/or recorded with improved image quality. In an example, a video call takes place between the object 140, e.g. a person, and an end user. The end user communicates to the person through the communication terminal 120 via the communication line 150. The camera 110 is placed in such a way that the face of the person participating in the video call is front illuminated. The camera 110 captures and processes the image of the person. The captured image is transmitted to the end user and/or the video display unit 130. Since the face of the person is front illuminated, regardless of the lighting conditions in the person's environment, the image captured by the camera 110 is free of shadows and has improved quality.

Figure 2A:
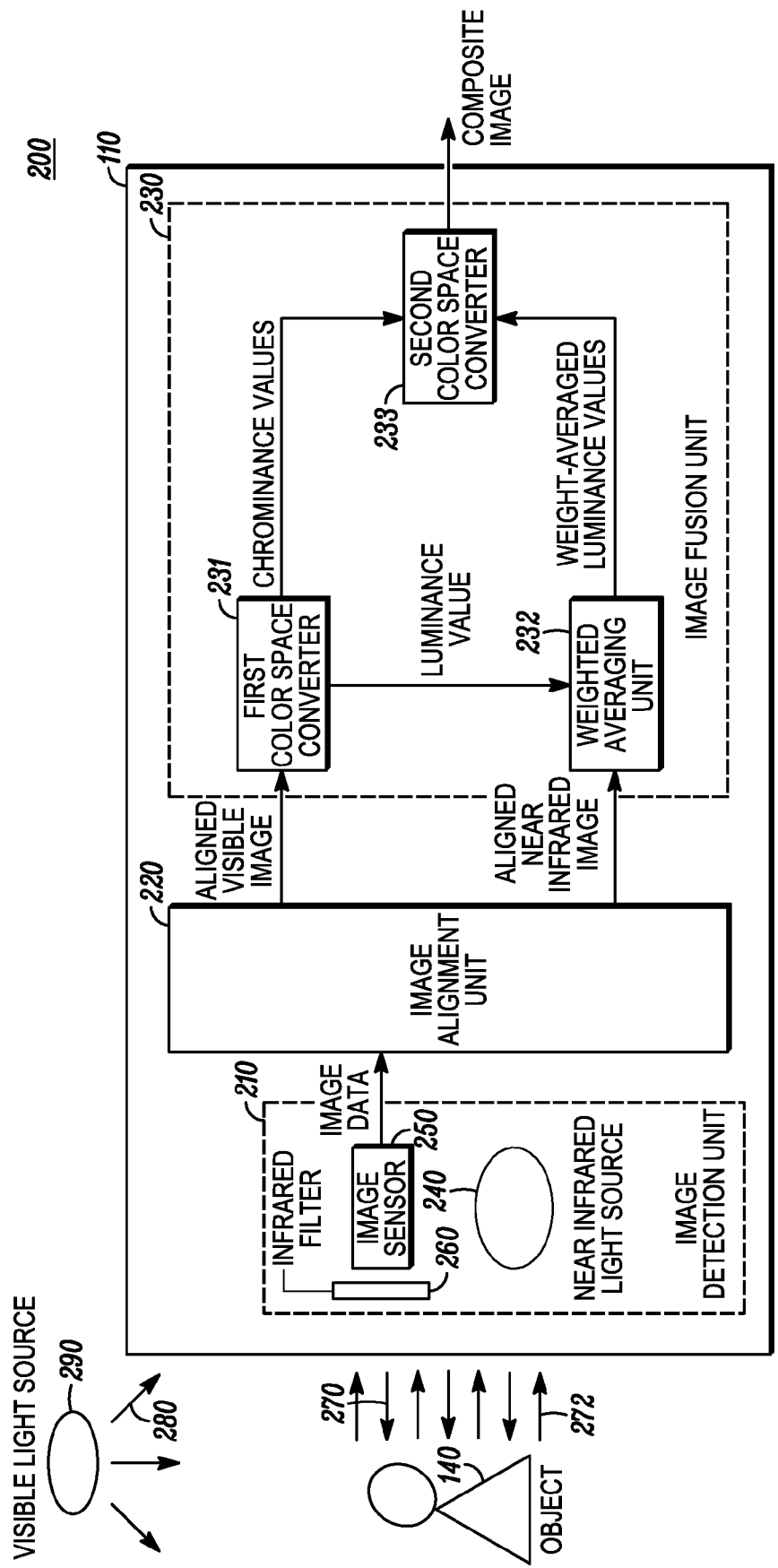
FIG. 2a is a block diagram illustrating an apparatus including a single sensor arrangement for improving image quality in video telephony.
Figure 2B:
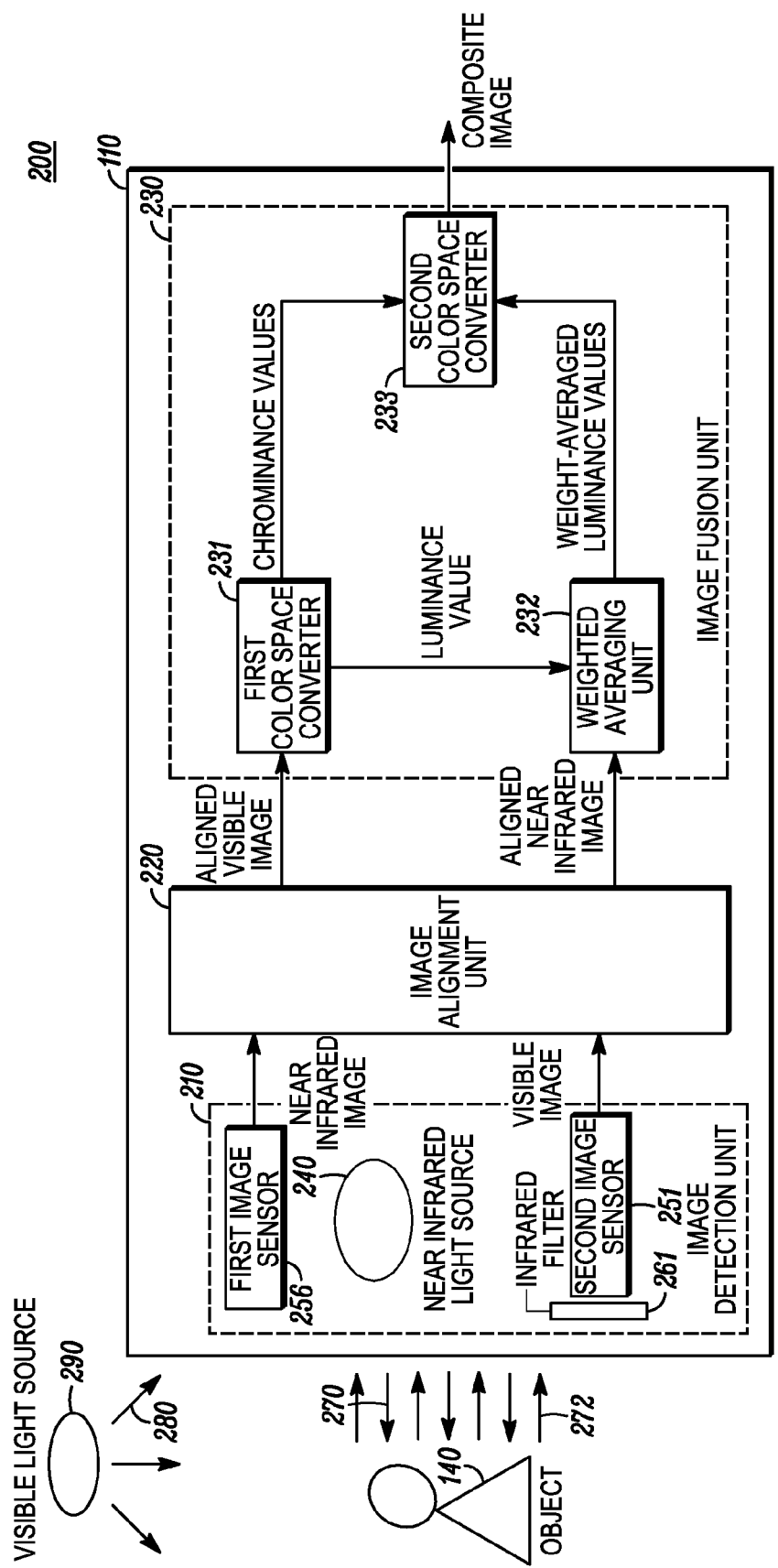
FIG. 2b is a block diagram illustrating an apparatus including a two sensor arrangement for improving image quality in video telephony.

Referring to FIGS. 2a and 2b, FIG. 2a is a block diagram illustrating an apparatus including a single sensor arrangement for improving image quality in video telephony. FIG. 2b is a block diagram illustrating an apparatus including a two sensor arrangement for improving image quality in video telephony. In one example, as shown in FIGS. 2a and 2b the apparatus is a camera 110 for capturing images of the object 140 in the user environment. The camera 110 comprises an image detection unit 210, an image alignment unit 220, and an image fusion unit 230.

The image detection unit 210 in FIG. 2a captures images of the object 140 that are in the camera's 110 field of view. The image detection unit 210 includes a near infrared light source 240, an image sensor 250, and an infrared filter 260. The image detection unit 210 illuminates the object 140 with near infrared radiation 270 such that the near infrared radiation 270 reflected from the object 140 is captured by the image sensor 250. Further, the image detection unit 210 captures visible light 280 reflected from the object 140. A source of visible light 280 includes natural light, room illumination etc. In an example the visible light source 290 emits radiation in the range of substantially 380-780 nm.

The near infrared light source 240 illuminates the object 140 in the camera's field of view. The near infrared light source 240 emits near infrared radiation 270, such that reflected near infrared radiation is produced from the object on which the near infrared radiation 270 is incident. Examples of the near infrared light source 240 are a light emitting diode (LED) or a laser diode light source. In an example embodiment, the near infrared light source 240 emits radiation in the range of less than 1-2 micrometer but greater than 0.75 micrometer. In an embodiment, the near infrared light source 240 emits radiation in a 0.94 micrometer wavelength range. As is known, other ranges may also produce similar results. As mentioned, the near infrared light source 240 is placed inside the image detection unit 210 of the camera 110 such that the object 140 in the camera's 110 field of view is front illuminated. By such placement of the near infrared light source 240 inside the image detection unit 210 the image sensor 250 generates shadow free images of the object 140.

The image sensor 250 converts a visual image of the object 140 into electrical signals for further processing. The image sensor 250 responds to the reflected near infrared radiation from the object 140 to generate a near infrared image of the object 140. Further the image sensor 250 responds to the reflected visible light from the object 140 to generate a visible image of the object 140. In one example, the image sensor 250 is housed inside the image detection unit 210 alongside the near infrared light source 240. In one example, the image sensor 250 is a conventionally used CMOS image sensor.

The infrared filter 260 functions to filter out near infrared radiation 270 reflected from the object 140. In an example embodiment, the infrared filter 260 is a switchable filter that switches between an active and an inactive state. The switching operation of the infrared filter 260 can be implemented electronically and/or mechanically. When the infrared filter 260 is in the active state, the near infrared radiation 270 reflected from the object 140 is filtered out while visible light 280 reflected from the object 140 is allowed to pass through the infrared filter 260 to the image sensor 250. The image sensor 250 coupled to the infrared filter 260 behaves as a visible image sensor when the infrared filter 260 is in the active state, so the image sensor 250 senses only the visible light 280 reflected from the object 140. For example, the image sensor 250 may sense natural light or room illumination found in the room. As mentioned earlier, such natural light or room illumination is considered to be a source of visible light 290 for the image sensor 250.

When the infrared filter 260 is in the inactive state, the image sensor 250 behaves as a near infrared image sensor. In the inactive state, the infrared filter 260 allows both visible light 280 and near infrared radiation 270 reflected from the object 140 to pass through the infrared filter 260 to the image sensor 250. The infrared filter 260 switches between its active and inactive states successively in time so that a visible image and a near infrared image of the object 140 collected by the image sensor 250 are interleaved. The switching operation of the infrared filter 260 takes place successively in time. As an example, at time t−1, the infrared filter 260 is in its inactive state such that the image sensor 250 acts as near infrared image sensor and generates a first image data responsive to the reflected near infrared radiation. The first image data represents a near infrared image of the object 140. At time t, the near infrared filter 260 is switched to its active state such that the image sensor 250 acts as a visible image sensor and generates a second image data responsive to the reflected visible light. The second image data represents a visible image of the object 140. Again at time t+1, the infrared filter 260 is in its inactive state and generates a near infrared image of the object 140 and the image sensor 250 continuously generates image data in such a sequence. In this embodiment, the near infrared image and the visible image of the object 140 are generated at different times. In another example, the near infrared image sensor may generate images from different perspectives.

In an embodiment, as shown in FIG. 2b, the image detection unit 210 comprises two sensors, a first image sensor 256 and a second image sensor 251. The second image sensor 251 is coupled to an infrared filter 261 and acts as a visible image sensor. The visible image sensor 251 generates a visible image responsive to the reflected visible light from the object 140. In this embodiment, the infrared filter 261 may be a static infrared filter where the infrared filter 261 remains continuously in an active state. The first image sensor 256 is not coupled to an infrared filter and acts as a near infrared image sensor. The near infrared image sensor 256 generates a near infrared image responsive to the reflected near infrared radiation from the object 140. In this two sensor arrangement, the visible image sensor 251 and the near infrared image sensor 256 are synchronized with respect to the time of image generation and the two sensors (251, 256) essentially have the same field of view. The image sensors (251, 256) concurrently in time generate an image of the object 140 in their field of view. As an example, concurrently means that both the near infrared image sensor 256 and the visible image sensor 251 generate an image of the object 140 at the same time. Because both sensors generate the image at the same time, even if the object 140 is in motion, there is no temporal difference in the images generated by the two sensors (251, 256).

Although a single sensor arrangement as shown in FIG. 2a and a two sensor arrangement as shown in FIG. 2b are described above, an embodiment may include an additional image sensor or additional image sensors. Thus, the mention of first and second is used solely for ease in description and is not limiting. An embodiment of the present invention may include three, four, or further additional image sensors to improve image quality. Thus any number of image sensors in a multiple image sensor embodiment is contemplated.

In a multiple image sensor embodiment, e.g. the two sensor arrangement as shown in FIG. 2b, the image sensors (e.g. 251, 256) may have a commonly shared optical system. The commonly shared optical system focuses the reflected near infrared radiation and the reflected visible light 272 from the object 140 on to the image sensors (251, 256). The commonly shared optical system includes a beam splitting element for splitting the reflected near infrared radiation and the reflected visible light 272 so that a portion of each of the reflected near infrared radiation and the reflected visible light 272 is focused to the near infrared image sensor and the visible image sensor.

Further, whether the apparatus 200 is a single sensor arrangement as shown in FIG. 2a or a two sensor arrangement as shown in FIG. 2b, the image alignment unit 220 receives the visible image and the near infrared image of the object 140 from the image detection unit 210. The image alignment unit 220 performs the process of bringing into alignment the visible image and the near infrared image to produce an aligned image pair. As used herein, align means to have the features within the visible image and the near infrared image match in the same pixel position, for example edges on edges. In one example, aligning is done by the image alignment unit 220 performing pixel by pixel registration of the visible image and the near infrared image.

As mentioned earlier, in the two sensor arrangement (See FIG. 2b) the near infrared image and the visible image that are generated are from different perspectives. As an example, the geographic placement of the visible image sensor is not the same as the geographic placement of the near infrared image sensor. Because the two sensors are placed differently, the near infrared image and the visible image will be in different coordinate systems. The image alignment unit 220 coupled to the first image sensor 256 and the second image sensor 251 performs the process of transforming the near infrared image and the visible images which are in different coordinates into a single coordinate system.

In an example, transforming the near infrared image and the visible image which are in different coordinates into a single coordinate system in order to align the visible image with the near infrared image means to apply linear spatial transformation on the near infrared image and the visible image. As an example, applying linear spatial transformation means to add, subtract, multiply, or divide the visible image and the near infrared image by a constant to arrive at a single coordinate system. Once linear spatial transformation is completed, the near infrared image and the visible image are aligned to form an aligned image pair of the object 140.

For a single sensor arrangement as shown in FIG. 2a, where the captured object 140 is static or where the image motion is negligibly small, the content for both the visible image and the near infrared image is the same. With this case, the visual and near infrared images are not required to be sent to the image alignment unit 220 for aligning the images. The visible image and the near infrared image are collected sequentially in time and directly fused. However, in an alternative, where the captured object 140 is in motion, the content of the images generated during time t−1, t, and t+1 is different. To overcome the differences in the content of the images generated during different times the images are aligned in the image alignment unit 220.

In an example, aligning the near infrared image with the visible image in order to form an aligned image pair means to apply temporal interpolation on the near infrared image. Accordingly, in the image alignment unit 220 the near infrared images are temporally interpolated by taking image motion from a sequence of images. As such, temporally interpolated means that the image sensor 250 generates a near infrared image at time t−1, at time t the image sensor 250 generates a visible image, and again at time t+1 the image sensor 250 generates a near infrared image. The image motion from images that are taken in time t−1 and t+1 are used to interpolate a near infrared image that could have been generated at time t. The temporally interpolated near infrared image will now have the same content as the visible image taken at time t and the near infrared image and the visible image are thus aligned. In an example, aligned means that the near infrared image is interpolated to align with the visible image. The aligned image pair is then sent to the image fusion unit 230 for fusion.

The image fusion unit 230 performs the process of combining two images to produce a composite image. The composite image contains information from the aligned visible image and the near infrared image pair. The image fusion unit 230 receives the aligned image pair from the image alignment unit 220 and performs image fusion on the aligned image pair. As is known, the aligned visible image comprises color components. Color components are generally defined as constituent colors that define the color space.

In one example, the image fusion unit 230 performs image fusion by using a first color space converter 231, a weighted averaging unit 232, and a second color space converter 233. The first color space converter 231 converts the color components of the aligned visible image into chrominance values and a luminance value. The chrominance values carry color information of the visible image whereas the luminance values represent the relative lightness or darkness of the visible image. In any case, the luminance value of the aligned visible image is sent to the weighted averaging unit 232. The weighted averaging unit 232 calculates a weighted average of the luminance value of the aligned visible image and the luminance value of the aligned near infrared image in order to produce better luminance values. In one example, the weighted averaging is performed on a pixel by pixel basis of the aligned image pairs.

In an embodiment, weighted averaging allows for different weights to be assigned to different pixels in infrared image and visible image so that regions of interest may be selected. A region of interest is defined by the degree to which a region in the image sensor's field of view is to be captured. As an example, if a person in the field of view forms the region of interest, larger weights are assigned to the pixels in the infrared image that form the person than the pixels in the infrared image that form a background in the field of view. Such an assignment of weights results in the pixels that form the person to get more luminance value from the infrared image than the pixels that form the background. The composite image produced will have intensity levels based on the weights assigned to the pixels. In the above example, the person has greater intensity levels whereas the background has lesser intensity levels.

The second color space converter 233 converts the chrominance values of the aligned visible image and the weight-averaged luminance values as described above into color components. This conversion produces a final composite image of the object 140 where the composite image looks life like. As an example, the colors in the composite image represent the colors of the object 140 in real life. Image fusion techniques performed by the image fusion unit 230 as described above can be can be implemented by any of the known color spaces including but not limited to Hue, Saturation, Value (HSV) color space, luma, blue chroma, red chroma (YCbCr) color space, Lightness, redness-greeness, yellowness-blueness (LAB) color space, and luma, In-phase, Quadrature (YIQ) color space.

In an embodiment, in addition to image fusion as discussed above, multi-scale decomposition may be applied for image fusion in the image fusion unit 230. Examples of multi-scale decomposition fusion are pyramid transforms and wavelet transforms. In multi-scale decomposition, a multiscale transform (MST) is performed on the image pairs. A composite representation of the image is formed by applying a fusion rule and a composite image is constructed by applying inverse multiscale transform (IMST). Such examples are known in the art and will not be further discussed herein.

Regardless of the way that image fusion is performed, the final composite image may have improved image quality, image detail, and a reduction in shadows due to front illumination of the object 140. For example, if a person participating in a video call is front illuminated by the near infrared light source 240, the person's image is free of shadows and has improved image quality.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the present invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

We claim:

1. An apparatus for improving image quality in video telephony comprising:
   an image detection unit, wherein the image detection unit comprises:
   a near infrared light source for illuminating an object, such that the object is front illuminated thereby producing reflected near infrared radiation, an image sensor for generating first image data responsive to the reflected near infrared radiation,
   an infrared filter for filtering the reflected near infrared radiation while allowing reflected visible light from the object, wherein the image sensor further generates second image data responsive to the reflected visible light when the infrared filter is active;
   an image alignment unit coupled to the image sensor of the image detection unit for aligning a near infrared image from the first image data with a visible image from the second image data in order to form an aligned image pair; and
   an image fusion unit for forming a composite image of the object from the aligned image pair.

2. The apparatus of claim 1, further comprising a visible light source for illuminating the object thereby producing the reflected visible light.

3. The apparatus of claim 1, wherein the near infrared image and the visible image generated by the image sensor are interleaved.

4. The apparatus of claim 1, further comprising a second image sensor for generating the first image data responsive to the reflected near infrared radiation.

5. The apparatus of claim 1, wherein the near infrared light source emits near infrared radiation, such that reflected near infrared radiation is produced from the object on which the near infrared radiation is incident.

6. The apparatus of claim 1, further comprising an optical system to focus the reflected visible light and the reflected near infrared radiation from the object on to the image sensor.

7. The apparatus of claim 1, wherein the image alignment unit forms the aligned image pair by applying linear spatial transformation on the near infrared image and the visible image.

8. The apparatus of claim 1, wherein the image alignment unit forms the aligned image pair by applying temporal interpolation on the near infrared image.

9. The apparatus of claim 1, wherein the image fusion unit comprises:
   a first color space converter for converting color components of the aligned visible image into chrominance values, and a luminance value;
   a weighted averaging unit for calculating a weighted average of the aligned visible image luminance value and an aligned near infrared image luminance value; and
   a second color space converter for converting the chrominance values and the weight-averaged luminance values into color components to form the composite image.

10. The apparatus of claim 1, wherein the image detection unit, the image alignment unit, and the image fusion unit are embedded in a camera.

11. An apparatus for improving image quality in video telephony comprising:
    an image detection unit, wherein the image detection unit comprises:
    a near infrared light source for illuminating an object, such that the object is front illuminated thereby producing reflected near infrared radiation,
    a first image sensor for generating a near infrared image responsive to the reflected near infrared radiation, and
    a second image sensor coupled to an infrared filter for generating a visible image responsive to reflected visible light when the infrared filter is active,
    wherein the first image sensor and the second image sensor share a common optical system;
    an image alignment unit coupled to the first image sensor and the second image sensor to align the visible image with the near infrared image using linear spatial alignment, in order to form an aligned image pair; and an image fusion unit for forming a composite image of the object from the aligned image pair.

12. The apparatus of claim 11, wherein the image detection unit, the image alignment unit, and the image fusion unit are embedded in a camera coupled to a communication terminal.

13. The apparatus of claim 11, further comprising a visible light source for illuminating the object thereby producing the reflected visible light.

14. The apparatus of claim 11, wherein the infrared filter blocks the reflected near infrared radiation from the object to the second image sensor when the infrared filter is active.

15. The apparatus of claim 11, wherein the infrared filter is continuously in an active state.

16. The apparatus of claim 11, wherein the image alignment unit forms the aligned image pair by applying linear spatial transformation on the near infrared image and the visible image.

17. The apparatus of claim 11, wherein the image fusion unit comprises:
   a first color space converter for converting color components of the aligned visible image into chrominance values, and a luminance value;
   a weighted averaging unit for calculating a weighted average of the aligned visible image luminance value and an aligned near infrared image luminance value; and
   a second color space converter for converting the chrominance values and the weight-averaged luminance values into color components to form the composite image.

18. A system for improving image quality in video telephony comprising:
   a camera, wherein the camera comprises
      an image detection unit comprising
         a near infrared light source for illuminating an object, such that the object is front illuminated thereby producing reflected near infrared radiation,
         an image sensor for generating first image data responsive to the reflected near infrared radiation,
         an infrared filter for filtering the reflected near infrared radiation while allowing reflected visible light from the object, wherein the image sensor further generates second image data responsive to the reflected visible light when the infrared filter is active;
      an image alignment unit coupled to the image sensor of the image detection unit to align a near infrared image from the first image data with a visible image from the second image data in order to form an aligned image pair; and
      an image fusion unit for forming a composite image of the object from the aligned image pair;
   a communication terminal coupled to the camera to receive the composite image from the image fusion unit of the camera and to transmit the composite image to a communication line,
   a video display unit coupled to the communication terminal for displaying images of the object.

19. The system of claim 18, wherein the camera further comprises a second image sensor for generating the first image data responsive to the reflected near infrared radiation.

20. The system of claim 18, wherein the communication line transmits the composite image to an end user.

* * * * *